Aug. 25, 1925.  J. J. DAVIS  1,551,137
LOCKING LINK
Filed Aug. 27, 1924
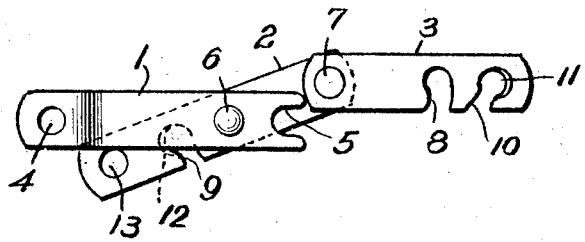
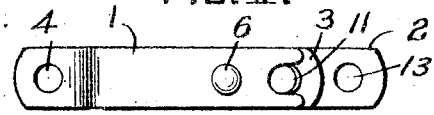
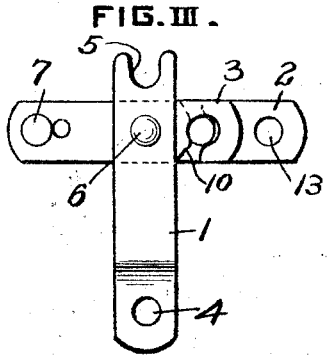
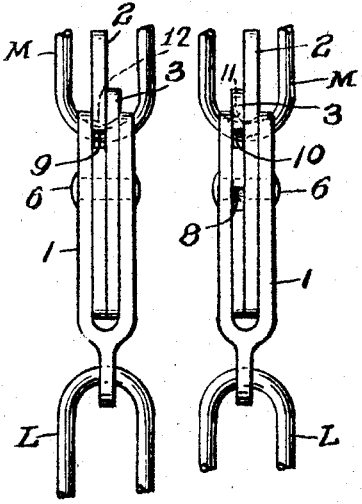
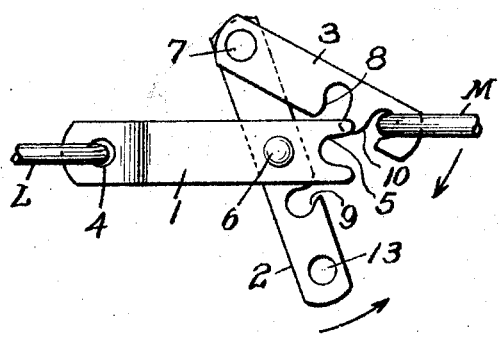
WITNESSES
INVENTOR
John J. Davis
by Christy and Christy
his attorneys Patented Aug. 25, 1925.

1,551,137

UNITED STATES PATENT OFFICE.

JOHN J. DAVIS, OF ERIE, PENNSYLVANIA.

LOCKING LINK.

Application filed August 27, 1924. Serial No. 734,400.

*To all whom it may concern:*

Be it known that I, JOHN J. DAVIS, residing at Erie, in the county of Erie and State of Pennsylvania, a citizen of the United States, have invented or discovered certain new and useful Improvements in Locking Links, of which improvements the following is a specification.

My invention relates to locking links, and while it is of general applicability in connecting the ends of such tension members as ropes and chains, it finds particular serviceability in locking the ends of a tire chain to position upon a resilient vehicle tire.

A link embodying my invention is illustrated in the accompanying drawing. Fig. I shows in side elevation the link expanded. Fig. II shows the link collapsed. Fig. III is diagrammatic, in that the position shown is one which is never assumed in service, but serves to indicate the relative arrangement of the parts. Figs. IV and V are views in side elevation showing from opposite sides the link in collapsed position and secured to opposite terminal links of a tire chain. Fig. VI is a view in side elevation, showing the link in the act of collapsing and of bringing the two opposite ends of a tire chain to locked continuity.

The link is made up of three bars, to which the numerals 1, 2, and 3 are applied. Bar 1 is bifurcated, as will appear on comparison of Figs. I and IV, and the inter-pivoting which I am about to describe is such that bars 2 and 3 may be collapsed between the furcations of bar 1. Bar 1 is at one end adapted for firm engagement with one end of the chain or other tension member whose ends are to be connected. Ordinarily this provision will take the form of an eye 4, through which eye, as is shown in Figs. IV, V, and VI, a terminal link L of a tire chain is shown to be extending. This terminal link may of course be especially constructed for separation and for the release from it of the locking link of my invention. But my invention is not concerned with the particular structure of this terminal link. At its opposite and bifurcated end the bar 1 is provided with aligned notches 5.

The bar 2 is pivoted between the furcations of the bar 1, and the point of pivoting is approximately medial with respect to the bar 2, although adjacent the notched end of bar 1. The pivot is indicated at 6. The bar 3 is pivoted at one end to one end of the bar 2. The pivot is indicated at 7. On this pivot 7 the bars 2 and 3 may be collapsed to the position shown in Fig. III, and being so collapsed may be further collapsed between the furcations of bar 1, as appears in Figs. II, IV, and V. A slot 8 is formed in bar 3 and extends in the arc of a circle concentric with pivot 7 and on a radius equal to the distance measured on bar 2 between pivots 6 and 7. This slot permits the collapse of the three bars to the position shown in Figs. II, IV, and V.

The bar 2 toward the end opposite that at which the bar 3 is pivoted to it, is provided with a slot 9. This slot is cut on the arc of a circle concentric with the pivot 7. Bar 3 is provided with a complementary oppositely extending slot 10, also formed on the arc of a circle concentric with pivot 7, and formed on equal radius with slot 9. As bars 2 and 3 collapse one relatively to the other on pivot 7, these two slots 9 and 10 come to alignment. These two slots 9 and 10 at their inner ends, at or near the midline of the two bars, are enlarged in the direction of the length of the bars, and the forward outer edges are bevelled, as indicated at 11 and 12, so that the link M, when the locking link is collapsed upon it, shall under traction have an extended and smooth bearing surface and shall the more securely hold the link against expanding and opening.

The link 2 is conveniently prolonged to extend, when the parts are collapsed, beyond the link 3, and this extended end is provided with an eye 13, through which an instrument may be hooked to open the collapsed link.

Fig. VI shows the link in the act of closing, and here the operation is abundantly illustrated. When the parts are in the extended position shown in Fig. I, the bar 1 having previously been secured to the link L at one end of the tire chain, the link M at the opposite end of the chain is slipped through slot 10 in the bar 3, until it comes to rest in the enlarged longitudinal extension thereof. The three bars are then manipulated and brought to the position shown in Fig. VI. In this position the bar 2 is being swung on pivot 6, and the bar 3 is being swung on pivot 7, so that the two bars 2 and 3 are moving relatively to the bar 1 in the opposite directions indicated by the arrows, and as they are so moving, the two co-operating slots 9 and 10 of the two bars 2 and 3 are meeting, until presently their enlarged inner extensions will coincide one with another, and, simultaneously, will coincide with the aligned notches 5 in bar 1, and when that has occurred, the link is wholly collapsed to the position shown in Fig. II, and is locking the two ends of the chain together in the position shown in Figs. IV and V.

It will be observed that in this operation of locking, the two links L and M are being drawn one toward another, and in so being drawn together (supposing the application to be to a tire chain) the chain is constricted upon the elastic body of the tire and so the elasticity of the tire is relied upon additionally to hold the link secure in collapsed position. It will be perceived that when the chain is so drawn taut, the link M is held to snug engagement with the forwardly bevelled surfaces 11 and 12 of the recesses in links 2 and 3, and so accidental opening of the link is resisted. Opening is effected only by drawing the links L and M more closely together.

I claim as my invention:

1. In a locking link the combination of three bars, the first pivoted medially, the third terminally to the second, the assembly by such pivoting being adapted to be alternately extended and collapsed, the first of said bars being provided at one end with an eye and at the opposite end with a notch, the second being provided at the end opposite that at which the third is pivoted to it, with a slot, and the third of said bars being provided with a slot, the slots in the second and third bars and the notch in the first co-operating as the structure is collapsed to form an eye.

2. In a locking link the combination of a bifurcated bar provided at its base with an eye and at the extremities of its furcations with aligned notches, a second bar pivoted medially between the furcations of the first, and a third bar pivoted at one end to one end of the second, the second and the third bar adapted to be swung into alignment and to be collapsed in alignment within the furcations of the first bar, the second bar and the third being provided with oppositely opening slots circumferential with respect to the common pivot point of said bars and equidistant from said pivot point, said slots adapted to meet in alignment with the notches in the first bar as the structure is collapsed.

In testimony whereof I have hereunto set my hand.

JOHN J. DAVIS.